Jan. 19, 1971      E. C. BERNARD      3,556,894

METHOD OF MANUFACTURE OF ADHESIVE TRANSFER

Filed Oct. 30, 1967

INVENTOR
EMILE C. BERNARD

ATTORNEY
A. L. Lock

United States Patent Office 3,556,894
Patented Jan. 19, 1971

3,556,894
METHOD OF MANUFACTURE OF ADHESIVE TRANSFER
Emile C. Bernard, Beauvais, France, assignor to Societe Novacel, Paris, France, a corporation of France
Filed Oct. 30, 1967, Ser. No. 678,894
Claims priority, application France, Feb. 6, 1967, 93,768
Int. Cl. B44c 1/10
U.S. Cl. 156—235
8 Claims

ABSTRACT OF THE DISCLOSURE

A method of manufacture of composite adhesive transfer material in rolled bands and strips, in which a film of plastic material is formed on a temporary non-adhesive support, this film is coated with a layer of pressure-sensitive adhesive, the composite band thus formed being dried and wound into a roll, the adhesive being applied against the face of the next adjacent turn of the roll; the rolled band is then unwound so as to separate the plastic film from the temporary support, the second face of the film is coated with a layer of adhesive, and finally the composite band thus formed is wound into a roll.

---

The present invention relates to adhesive transfer articles sensitive to pressure.

These articles are well known and are employed in a great many applications, especially for joining together two surfaces or alternatively to provide an adhesive film on porous, rough or irregular surfaces which cannot be directly coated in a uniform or economic manner.

The adhesive transfer articles sensitive to pressure, generally in bands or strips, comprise temporary supports which have a non-adherent surface with respect to the adhesive, but which nevertheless permit the strip to be made-up in the form of rolls. The adhesives employed must possess sufficient cohesion and holding power to avoid creeping over the edges of the windings and the formation of filaments during the course of unwinding or application, and so as to render the adhesive article easy to manipulate during use.

In order to comply with this condition, it has been proposed to embed in the adhesive mass a sheet of paper or non-woven very thin material. The articles thus produced have a high cost of manufacture and their fragile nature necessitates great precautions and a special technique in manufacture. Adhesive transfer articles are also known in which reinforcing fibres are dispersed throughout the adhesive mass. In these articles, the quality of the adhesive is limited by the presence of the fibres; the mechanical characteristics are irregular and poor and manipulation is difficult.

The present invention has for its object to remedy the known disadvantages of manufacture and to provide pressure-sensitive adhesive transfer articles which possess improved qualities.

According to the invention, there is formed in situ in the adhesive mass, a film of plastic material of small thickness, this film remaining embedded in the adhesive mass.

The film incorporated in the adhesive mass is preferably comprised by a transparent plastic material.

This material may or may not be plastified. The thickness of the film is such that its weight should preferably be comprised between 3 and 30 grams per square metre.

By this means, there are obtained in a simple manner adhesive articles which possess an excellent cohesion and good mechanical properties. It is possible to vary the strength and the flexibility within wide limits, by varying the nature and the thickness of the film of plastic material incorporated in the adhesive mass. The adhesives thus produced can easily be transferred without any formation of adhesive filaments and without deformation of the adhesive layer transferred. This transfer may be effected either manually or mechanically on any kind of surface whatever.

According to one method of application of the process, there is formed on a temporary non-adherent support, a film of plastic material of small thickness, and this film is coated, while it remains carried on the temporary support, with a layer of adhesive which is sensitive to pressure. After drying the adhesive, the band is wound in a roll, during the course of which winding the adhesive comes into contact with the second face of the temporary support of the adjacent turn with which it is in contact. The roll is then unwound and the film of plastic material is separated from the temporary support, the adhesive coating being then protected by the said temporary support. The second face of the film of plastic material is then coated with a layer of adhesive which is sensitive to pressure, after which the composite layer thus obtained is finally wound into a roll.

The application of the invention will be more fully described with reference to the accompanying drawings, which represent the successive stages of the manufacture of the adhesive transfer article. In the drawings.

Figure 1:
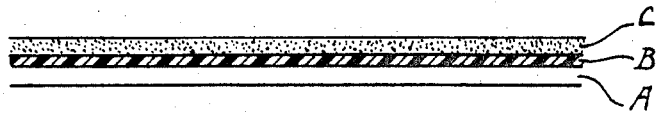
FIG. 1 shows in cross-section the initial combination of the support, the associated film and the first layer of adhesive.

In order to produce the adhesive article according to the invention, the starting combination is shown in FIG. 1 and comprises a temporary support A, constituted for example by a sheet of siliconed paper, with a non-adherent coating on its two faces. This sheet A is coated on one of its faces with an appropriate solution to ensure the formation of a transparent cohesive film B. The film B, thus carried by the paper A, is coated with an adhesive composition forming a layer C.

The nature of the elements A, B and C is determined in such manner that the adhesion between the siliconed paper A and the film B is less than the adhesion between the paper A and the layer of adhesive C.

Figure 2:
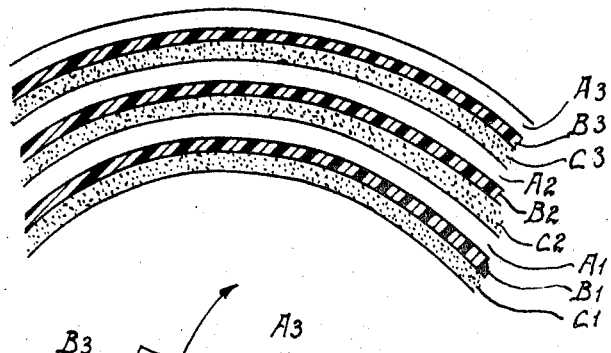
FIG. 2 shows the arrangement of the article of FIG. 1 when wound into a roll.
Figure 3:
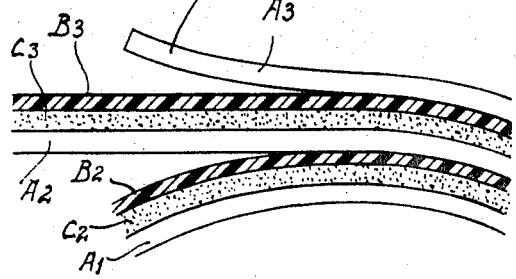
FIG. 3 shows the subsequent unwinding of the rolled article in accordance with FIG. 2, with separation of the film of plastic material.

The combination A, B and C thus obtained is wound in a coil, as shown in FIG. 2, forming successive turns $A_1$, $B_1$, $C_1$; $A_2$, $B_2$, $C_2$; $A_3$, $B_3$, $C_3$, etc. This combination is then unwound, as shown in FIG. 3.

During the course of this unwinding action, the sheet $A_3$ is detached from the film $B_3$, the latter remaining attached to the layer of adhesive $C_3$. However, due to the greater adhesion between the elements A and C, the unwound portion carries with it the siliconed paper $A_2$ of the lower layer. Thus, by the unwinding action, there is obtained a composite band $B_3$, $C_3$, $A_2$.

In this combination $B_3$, $C_3$, $A_2$, the film $B_3$, separated from the paper support $A_3$, is left bare on its upper face.

Figure 4:
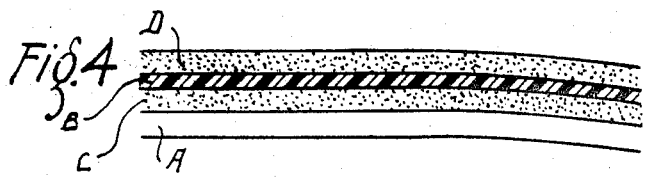
FIG. 4 shows the addition of the second layer of adhesive to the unwound composite layer shown in FIG. 3.
Figure 5:
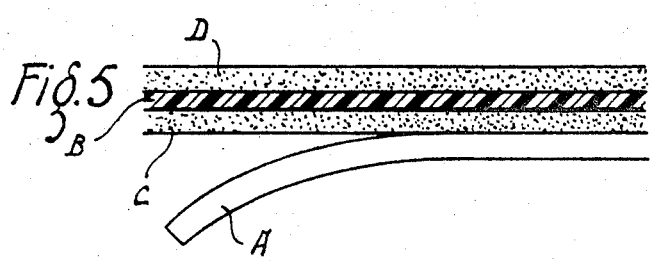
FIG. 5 is a view in cross-section of the completed adhesive article.

This upper face of the film B is then coated with an adhesive layer B, as shown in FIG. 4.

After drying, there is thus obtained on the siliconed paper support A, a double-face adhesive article comprising two adhesive faces C and D in which is embedded the transparent and invisible film B. The composite band B, C, D, can be wound on a reel with the paper A serving as a separation between the adhesive layers of the successive turns.

The examples given below by way of explanation and not in any limitative sense, describe various methods of embodiments of the invention following the process indicated above.

EXAMPLE 1

In the arrangement of FIG. 1, the siliconed paper A is coated with a solution of 15% cellulose acetate in acetone. After drying, this coating provides a cohesive and transparent film B having a proportion of 5 grams per square metre.

The film B is then coated with an adhesive composition comprising the following mixture dissolved in petroleum spirit:

| | Parts |
|---|---|
| Poly-isobutylene—Reference Oppanol B100 | 10 |
| Poly-isobutylene—Reference Oppanol B10 | 30 |
| Poly-isobutylene—Reference Oppanol B3 | 10 |

This composition is applied in such manner as to form a layer C of 25 grams per square metre. It adheres well to the film B of cellulose acetate.

After unwinding (see FIG. 3), the second face of the film B is coated with a layer D of the same adhesive product as the first face and having the same thickness as the first layer (see FIG. 4).

There is thus obtained a double-face adhesive product in which the film B of cellulose acetate is inserted between the two adhesive layers C and D.

As this film B is transparent, when incorporated in the adhesive it is practically invisible.

EXAMPLE 2

On a temporary support A, constituted by a film of polyethylene, there is poured a 12% solution of polyvinyl aceto-chloride in acetone, so as to obtain after drying a cohesive film B of aceto-chloride having a weight of 7 grams per square metre.

This film B is coated with an adhesive solution comprising a solution in petroleum spirit of:

| | Parts |
|---|---|
| Poly-isobutylene—Oppanol B100 | 10 |
| Poly-isobutylene—Oppanol B10 | 20 |
| Poly-isobutylene—Oppanol B3 | 10 |
| Ketone resin | 13 | so as to obtain an adhesive layer of 30 grams per square metre.

The second face of the film B is then coated with the same adhesive composition in order to form the layer D.

EXAMPLE 3

A siliconed paper A is coated on one of its faces with an acetone solution comprising 15% of cellulose acetate and 5% of butyl phthalate.

After drying, the film of transparent plastic cellulose acetate formed is coated with a solution in petroleum spirit of:

| | Parts |
|---|---|
| Ethyl-ether polyvinyl resin (known commercially as "Bakelite EHBM") | 80 |
| Ethyl-ether polyvinyl resin (known as "Bakelite EDBC") | 20 | in order to obtain an adhesive layer of 30 grams per square metre.

After drying, the film B is coated on the side opposite to C with an adhesive composition D similar or analogous to the layer C.

It will of course be understood that the invention is not limited merely by the examples of construction, but extends to all alternative forms in the same spirit. In particular, the temporary support can be constituted by any appropriate material, the adhesion of which is very low with respect to the film of plastic material, and the adhesion of which is also low with respect to the pressure-sensitive adhesive employed. It may be constituted by a film of polytetrafluoro-ethylene, commercially known as "Teflon," by a film of poly-propylene, of paper made non-adherent by a coating of silicone or by coating with polyethylene, or with any other material which has been made non-adherent.

The film embedded in the adhesive mass may be constituted by polyvinyl acetate, polyvinylidene chloride, nitrocellulose, poly-acrylates, synthetic rubbers, the said products being plastified or not, or of any other film-producing product capable of giving a transparent film invisible in the adhesive mass, for which it has a good affinity.

The film may be formed from solutions in a solvent medium, from emulsions, from plastisols, by calendering from solid products, or by any other means capable of forming a film.

The film may have any desired weight per square metre, but this weight will preferably be comprised between 3 and 30 grams per square metre, as indicated above.

Depending on the nature and the size of the plastic film produced in situ, it is possible to obtain a whole range of tapes going from the adhesive transfer article in bands to the double face adhesive tape.

The adhesive layer may be formed from an composition which gives, after drying, a pressure-sensitive adhesive, the affinity of which is very high with respect to the reinforcing film, and low with respect to the temporary support.

The adhesive layers which cover each of the faces of the reinforcing film may be identically the same or different.

What we claim is:

1. A method of manufacture of a pressure-sensitive adhesive strip comprising the steps of: forming a film of plastic material on one face of a temporary non-adherent support; coating said film with a layer of pressure-sensitive adhesive so as to form a composite strip; drying and rolling said composite strip into a roll so that the adhesive is applied against the other face of the adjacent turn of the temporary support, the adhesion between the temporary support and the film being less than that between the temporary support and the adhesive so that upon unwinding said rolled strip the film of plastic material with the layer of pressure-sensitive adhesive is separated from said temporary support; and coating the second face of said film with a layer of adhesive.

2. The method of claim 1, in which said film of transparent plastic material is formed by a coating on said support of a plastic material in order to form a layer having a weight between 3 and 30 grams per square meter.

3. The method of claim 1, in which said non-adherent temporary support is a siliconed paper.

4. The method of claim 1, in which said non-adherent temporary support is a sheet of polyethylene.

5. The method of claim 1, in which said adhesive layers are composed of polyisobutylene.

6. The method of claim 1, in which said adhesive layers are composed of polyvinyl ethyl-ether.

7. The method of claim 1 in which the strength and the flexibility of the strip may be varied by varying the nature and thickness of the film of plastic material.

8. The method of claim 7 in which the plastic film is formed of a material selected from the group consisting of cellulose acetate, polyvinyl acetate, polyvinyl acetochloride, polyvinylidene chloride, nitro-cellulose and synthetic rubber.

References Cited

UNITED STATES PATENTS

| 2,607,711 | 8/1952 | Hendricks | 161—406X |
| 3,144,430 | 8/1964 | Schaffhausen | 161—167 |
| 3,403,045 | 9/1968 | Erickson et al. | 161—208 |
| 3,432,333 | 3/1969 | Hurst | 161—406 |

FOREIGN PATENTS

| 23,334 | 11/1963 | Japan | 156—247 |

LELAND A. SEBASTIAN, Primary Examiner

U.S. Cl. X.R.

156—247, 329, 334; 161—406